United States Patent
Tanaka et al.

(10) Patent No.: US 8,325,570 B1
(45) Date of Patent: Dec. 4, 2012

(54) THERMALLY-ASSISTED MAGNETIC RECORDING HEAD INCLUDING A PROTRUDING MEMBER

(75) Inventors: Kosuke Tanaka, Tokyo (JP); Tetsuya Roppongi, Tokyo (JP); Kei Hirata, Tokyo (JP); Susumu Aoki, Tokyo (JP); Takahiko Izawa, Tokyo (JP); Makoto Isogai, Tokyo (JP); Keita Kawamori, Tokyo (JP); Takeshi Tsutsumi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/363,795

(22) Filed: Feb. 1, 2012

(51) Int. Cl.
*G11B 11/00* (2006.01)
(52) U.S. Cl. ............. 369/13.33; 369/112.27; 360/125.31
(58) Field of Classification Search ............... 369/13.33, 369/13.32, 13.24, 13.14, 13.03, 13.02, 13.12, 369/13.01, 13.35, 112.01, 112.27, 112.14; 360/59, 125.31, 125.74, 125.75
See application file for complete search history.

(56) References Cited

U.S. PATENT DOCUMENTS

| 8,014,101 B2 * | 9/2011 | Shimazawa et al. ..... 360/125.31 |
| 8,077,558 B1 * | 12/2011 | Tsutsumi et al. .......... 369/13.33 |
| 8,102,625 B2 * | 1/2012 | Shiramatsu et al. ..... 360/125.74 |
| 2008/0198496 A1 | 8/2008 | Shimazawa et al. |
| 2009/0073597 A1 | 3/2009 | Shiramatsu et al. |

FOREIGN PATENT DOCUMENTS

JP       A-08-287444       11/1996

* cited by examiner

*Primary Examiner* — Ali Neyzari
(74) *Attorney, Agent, or Firm* — Oliff & Berridge, PLC

(57) ABSTRACT

A thermally-assisted magnetic recording head includes: a medium facing surface; a magnetic pole; a waveguide including a core and a cladding; a plasmon generator; and a protruding member. The protruding member is disposed between the medium facing surface and a front end face of the core facing toward the medium facing surface. The protruding member has a first end face located in the medium facing surface, and a second end face facing toward the front end face of the core and receiving light having propagated through the core and passed through the front end face. The protruding member is formed of a metal different from both a material forming the magnetic pole and a material forming the plasmon generator. The protruding member is heated and expanded by the light received at the second end face, so that the first end face gets protruded toward a magnetic recording medium.

12 Claims, 10 Drawing Sheets

THERMALLY-ASSISTED MAGNETIC RECORDING HEAD INCLUDING A PROTRUDING MEMBER

BACKGROUND OF THE INVENTION

1. Field of the Invention

The present invention relates to a thermally-assisted magnetic recording head that includes a waveguide, a plasmon generator, and a magnetic pole.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head section including a magnetoresistive element (hereinafter, also referred to as MR element) for reading and a write head section including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the magnetic recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a write magnetic field and heat are applied almost simultaneously to the area of the magnetic recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. As disclosed in, for example, U.S. Patent Application Publication Nos. 2008/0198496 A1 and 2009/0073597 A1, a known method for generating near-field light is to use a plasmon generator, which is a piece of metal that generates near-field light from plasmons excited by irradiation with light. The light for use in generating near-field light is typically guided through a waveguide, which is provided in the slider, to the plasmon generator disposed near a medium facing surface of the slider.

A thermally-assisted magnetic recording head that employs a plasmon generator as a source of generation of near-field light is configured so that the write head section includes the plasmon generator and a magnetic pole that produces a write magnetic field. The plasmon generator and the magnetic pole are located in close proximity to each other. In the thermally-assisted magnetic recording head of such a configuration, the plasmon generator and the magnetic pole constitute a main portion of the write head section. Now, a description will be made as to the problems with the thermally-assisted magnetic recording head having the above-described configuration.

Part of the energy of the light guided to the plasmon generator through the waveguide is transformed into heat in the plasmon generator. The plasmon generator and its vicinity therefore increase in temperature during the operation of the thermally-assisted magnetic recording head. The increase in temperature causes the plasmon generator and its vicinity to expand, so that part of the medium facing surface corresponding to the main portion of the write head section protrudes toward the magnetic recording medium.

Typically, the medium facing surface of the slider is covered with and protected by a protective film. Thus, a conventional magnetic head that performs no thermally-assisted magnetic recording will not be seriously damaged even if it comes into contact with the surface of the magnetic recording medium or a dust particle to a certain extent during operation. In the case of a thermally-assisted magnetic recording head, however, the plasmon generator and its vicinity increase in temperature during operation as described above, and this causes part of the protective film, particularly near the plasmon generator, to increase in temperature and become liable to be damaged. The part of the protective film protrudes toward the magnetic recording medium. The part of the protective film is therefore susceptible to damage when brought into contact with the surface of the magnetic recording medium or a dust particle. A serious damage to the part of the protective film would possibly cause the main portion of the write head section (the plasmon generator and the magnetic pole) to be exposed. The main portion of the write head section thus exposed may be damaged. More specifically, the main portion of the write head section may be mechanically damaged when brought into contact with the surface of the magnetic recording medium or a dust particle, or corroded when exposed to a high-temperature moist atmosphere.

U.S. Patent Application Publication No. 2009/0073597 A1 discloses a technology of providing a heat radiating film in the vicinity of a heating mechanism that includes a waveguide and a plasmon generator, in order to reduce the protrusion of part of the medium facing surface caused by the heating mechanism. Even with this technology, however, it is not possible to prevent a temperature increase and the protrusion of part of the medium facing surface caused by the heating mechanism, and consequently it is not possible to avoid damage to the main portion of the write head section.

JP-A-08-287444 discloses a technology of providing a projected portion of a certain height around an MR element on the medium facing surface of the slider to thereby prevent the MR element from coming into direct contact with a magnetic disk.

A thermally-assisted magnetic recording head may also conceivably be configured so that a projected portion of a certain height is provided around the main portion of the write head section on the medium facing surface of the slider in order to prevent the main portion of the write head section from coming into direct contact with the surface of the magnetic recording medium. In the case of the thermally-assisted magnetic recording head, however, the plasmon generator and its vicinity increase in temperature to cause part of the medium facing surface corresponding to the main portion of the write head section to protrude toward the magnetic recording medium, as described above. Furthermore, the amount of protrusion of the part of the medium facing surface varies depending on the ambient temperature. Thus, even if a projected portion of a certain height is provided around the main portion of the write head section on the medium facing surface of the slider, the part of the medium facing surface corresponding to the main portion of the write head section will protrude to come into direct contact with the surface of the magnetic recording medium, thereby possibly causing the main portion of the write head section to be damaged. The height of the projected portion can be increased in order to ensure that the part of the medium facing surface is prevented from directly contacting the surface of the magnetic recording medium. However, this may cause the distance between the main portion of the write head section and the magnetic recording medium to be excessively large, thereby making it impossible to improve the recording density.

OBJECT AND SUMMARY OF THE INVENTION

It is an object of the present invention to provide a thermally-assisted magnetic recording head that makes it possible to protect a main portion of the write head section constituted of a plasmon generator and a magnetic pole even when part of the medium facing surface corresponding to the main portion of the write head section gets protruded, and to provide a head gimbal assembly and a magnetic recording device that each include the thermally-assisted magnetic recording head.

A thermally-assisted magnetic recording head of the present invention includes: a medium facing surface that faces a magnetic recording medium; a magnetic pole; a waveguide; a plasmon generator; and a protruding member. The magnetic pole has an end face located in the medium facing surface, and produces a write magnetic field for writing data on the magnetic recording medium. The waveguide includes a core and a cladding, the core having a front end face that faces toward the medium facing surface and allowing light to propagate through. The plasmon generator has a near-field light generating part located in the medium facing surface, and is configured so that a surface plasmon is excited on the plasmon generator based on the light propagating through the core and the near-field light generating part generates near-field light based on the surface plasmon. The protruding member is disposed between the front end face of the core and the medium facing surface.

The protruding member has a first end face located in the medium facing surface, and a second end face facing toward the front end face of the core and receiving light that has propagated through the core and passed through the front end face. The protruding member is formed of a metal that is different from both a material that forms the magnetic pole and a material that forms the plasmon generator. The second end face of the protruding member is opposed to at least part of the front end face of the core, the at least part having an area greater than 50% of an entire area of the front end face. The protruding member is configured so that the light received at the second end face causes the protruding member to be heated and expanded to cause the first end face to get protruded toward the magnetic recording medium.

In the thermally-assisted magnetic recording head of the present invention, the core may have an evanescent light generating surface that generates evanescent light based on the light propagating through the core, and the plasmon generator may have a plasmon exciting part that faces the evanescent light generating surface with a predetermined spacing therebetween. In this case, the plasmon generator is configured so that a surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

The thermally-assisted magnetic recording head of the present invention may be configured so that when the protruding member is not heated and expanded, the first end face of the protruding member is in a protruded state toward the magnetic recording medium relative to the end face of the magnetic pole and the near-field light generating part. In the medium facing surface, the protruding member may be greater than the magnetic pole and the plasmon generator in width in the track width direction.

In the thermally-assisted magnetic recording head of the present invention, the material that forms the magnetic pole may contain one of Ni, Fe, and Co, while the material that forms the plasmon generator may contain one of Au, Ag, Al, and Cu. In this case, the metal that forms the protruding member may be lower in etching rate than Au, Ag, Al, Cu, Ni, Fe, and Co when etched by ion beam etching using oxygen ion beams at an incident angle of 45° or greater.

In the thermally-assisted magnetic recording head of the present invention, the metal that forms the protruding member may have a Mohs' hardness of 6 or more. Furthermore, the metal that forms the protruding member may have a melting point of 1100° C. or higher.

In the thermally-assisted magnetic recording head of the present invention, the metal that forms the protruding member may be one of Cr, Ti, Ta, V, and Nb. In this case, the material that forms the magnetic pole may contain one of Ni, Fe, and Co, while the material that forms the plasmon generator may contain one of Au, Ag, Al, and Cu.

The thermally-assisted magnetic recording head of the present invention may further include a pair of leads for supplying a current to the protruding member.

A head gimbal assembly of the present invention includes the thermally-assisted magnetic recording head of the present invention, and a suspension that supports the thermally-assisted magnetic recording head. A magnetic recording device of the present invention includes a magnetic recording medium, the thermally-assisted magnetic recording head of the present invention, and a positioning device that supports the thermally-assisted magnetic recording head and positions the same with respect to the magnetic recording medium.

In the thermally-assisted magnetic recording head, the head gimbal assembly, and the magnetic recording device of the present invention, the protruding member provided between the front end face of the core and the medium facing surface is configured so that the light received at the second end face causes the protruding member to be heated and expanded to cause the first end face to get protruded toward the magnetic recording medium. The present invention thus allows the main portion of the write head section, which is constituted of the plasmon generator and the magnetic pole, to be protected even when part of the medium facing surface corresponding to the main portion of the write head section gets protruded.

Other and further objects, features and advantages of the present invention will appear more fully from the following description.

DETAILED DESCRIPTION OF THE PREFERRED EMBODIMENT

Figure 5:
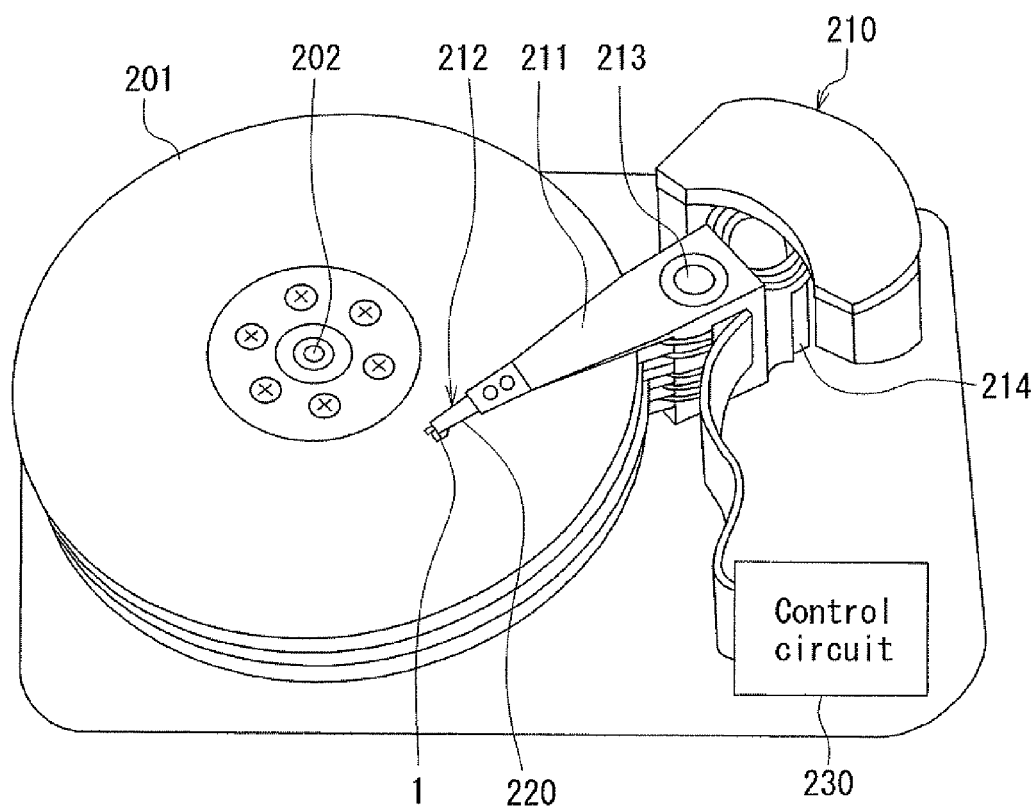
FIG. 5 is a perspective view showing a magnetic recording device according to the embodiment of the invention.

A preferred embodiment of the present invention will now be described in detail with reference to the drawings. First, reference is made to FIG. 5 to describe a magnetic disk drive that functions as a magnetic recording device according to the embodiment of the invention. As shown in FIG. 5, the magnetic disk drive includes a plurality of magnetic disks 201 serving as a plurality of magnetic recording media, and a spindle motor 202 for rotating the magnetic disks 201. The magnetic disks 201 of the embodiment are for use in perpendicular magnetic recording. Each magnetic disk 201 has such a structure that a soft magnetic under layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 6:
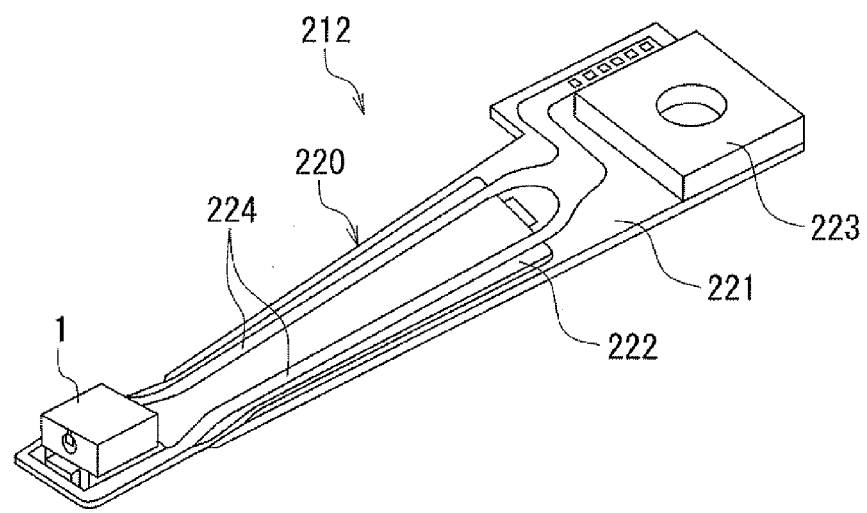
FIG. 6 is a perspective view showing a head gimbal assembly according to the embodiment of the invention.

FIG. 6 is a perspective view showing the head gimbal assembly 212 of FIG. 5. As described above, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to one having the configuration shown in FIG. 6. For example, the head gimbal assembly of the present invention may have an IC chip for driving the head that is mounted somewhere along the suspension 220.

Figure 4:
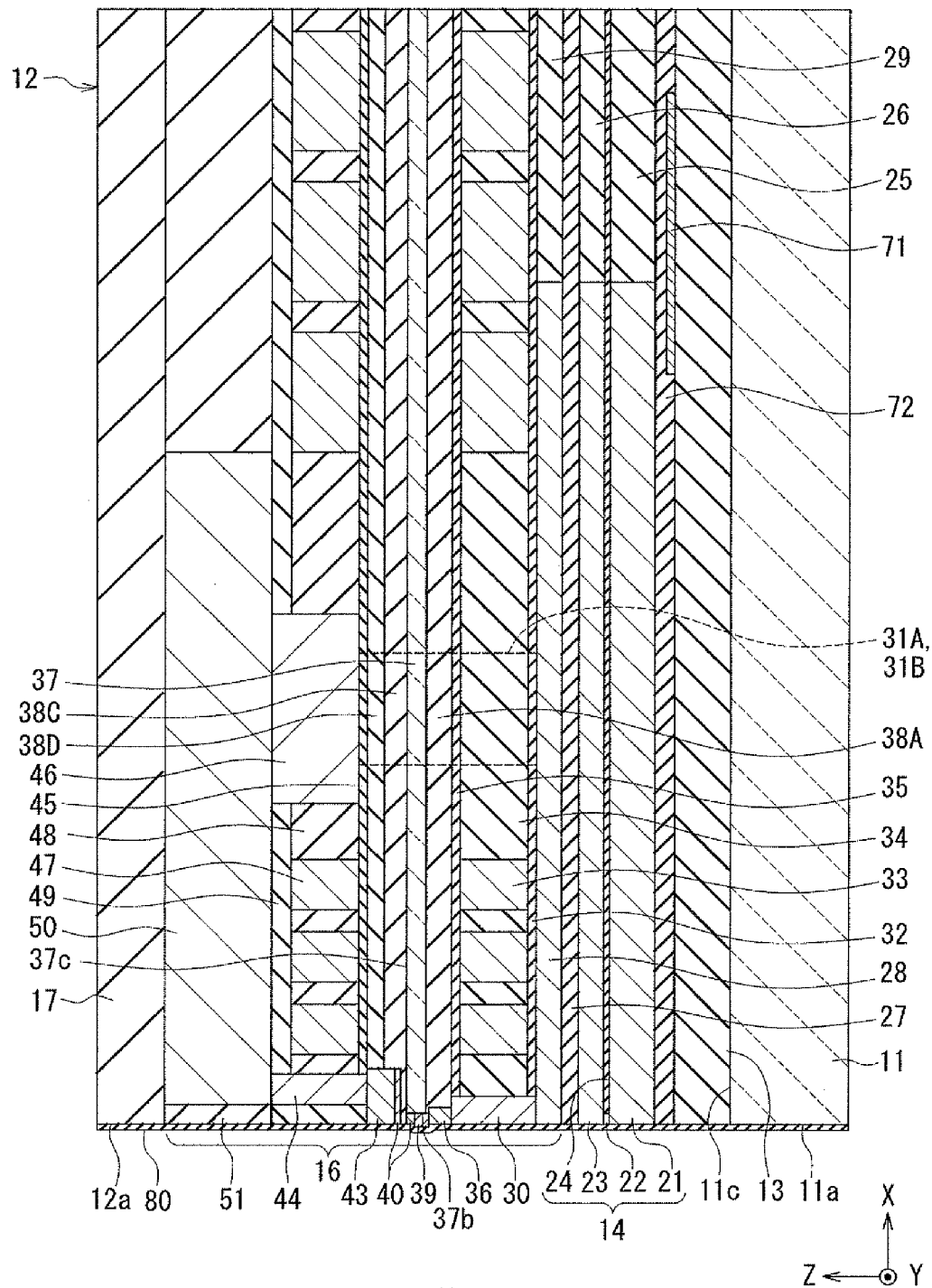
FIG. 4 is a cross-sectional view showing a head section of the thermally-assisted magnetic recording head according to the embodiment of the invention.
Figure 7:
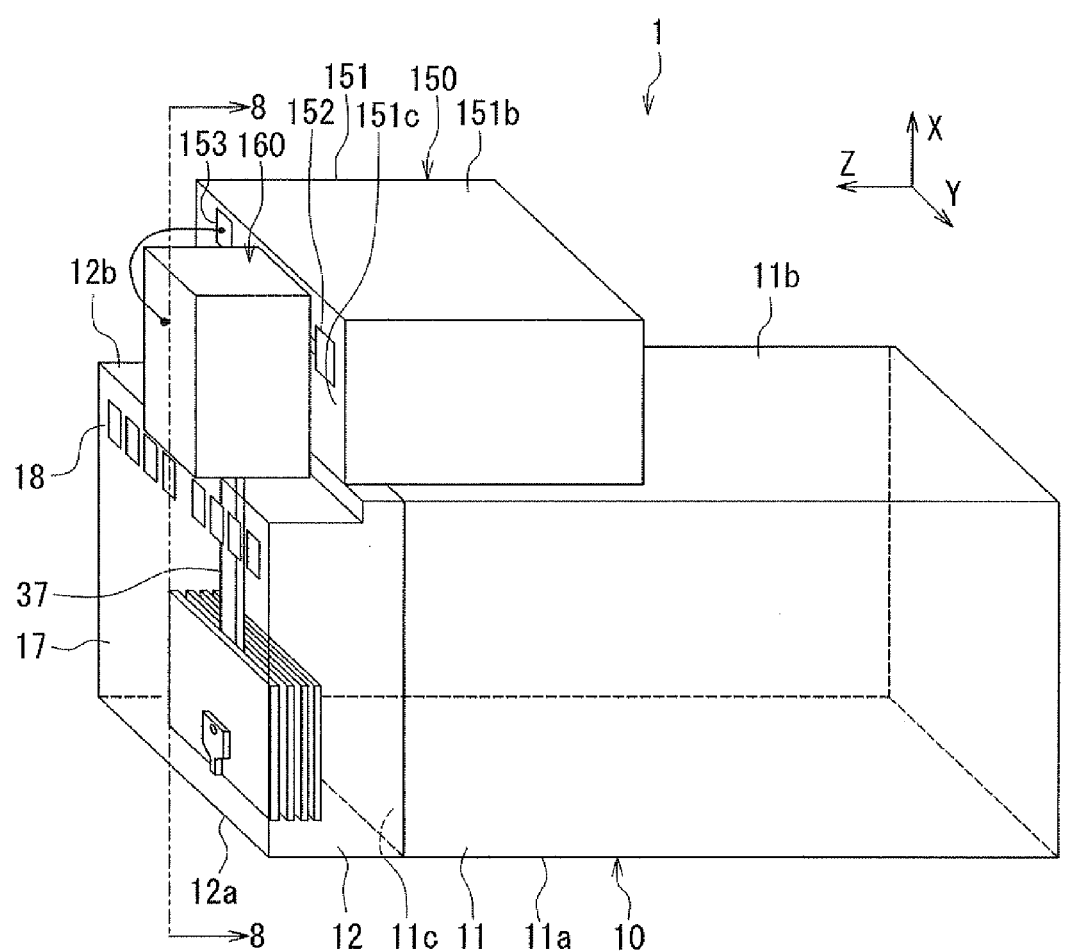
FIG. 7 is a perspective view showing the thermally-assisted magnetic recording head according to the embodiment of the invention.
Figure 8:
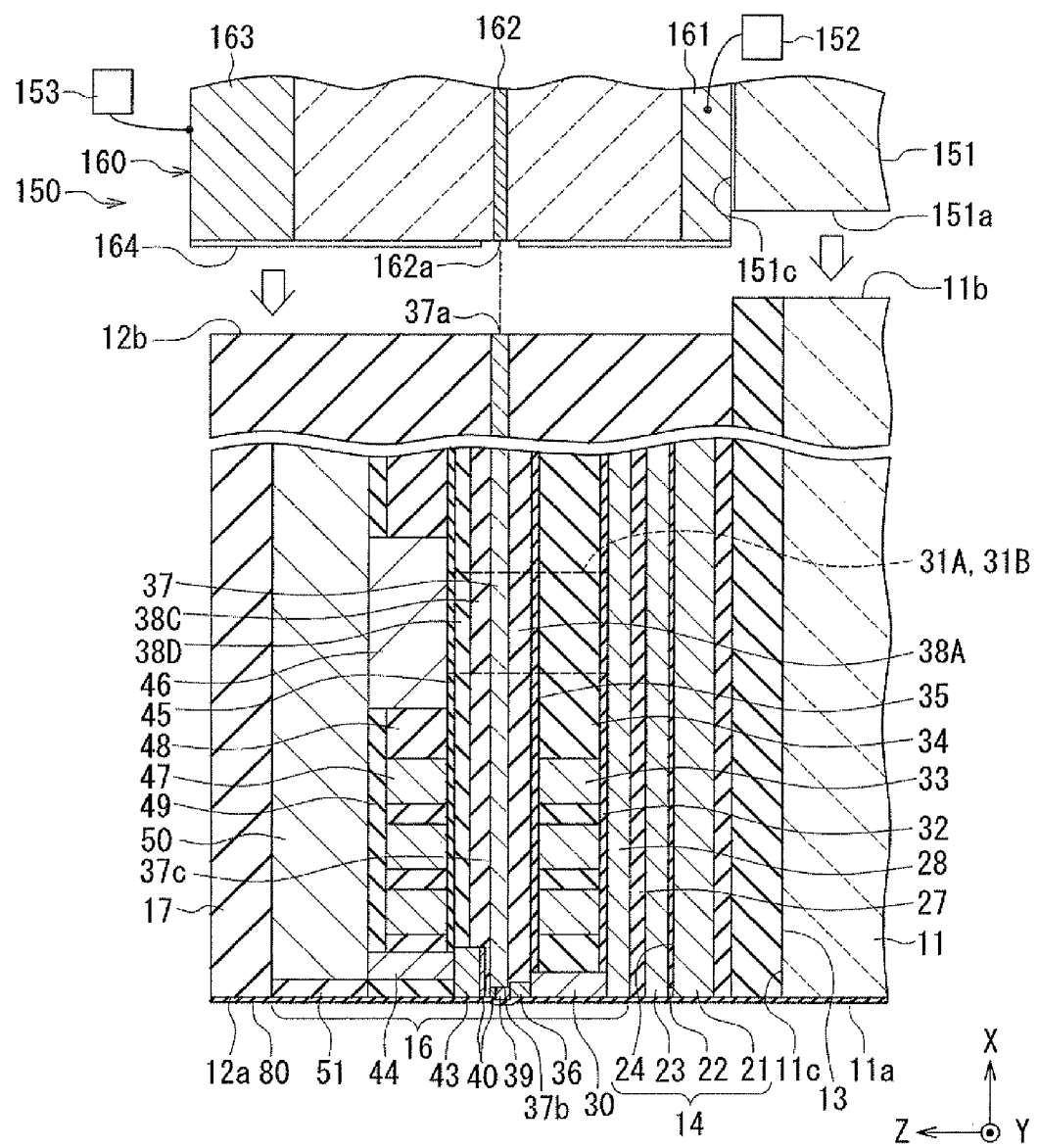
FIG. 8 shows a cross section taken along line 8-8 of FIG. 7.

The configuration of the thermally-assisted magnetic recording head 1 according to the embodiment will now be described with reference to FIG. 4, FIG. 7, and FIG. 8. FIG. 4 is a cross-sectional view showing a head section of the thermally-assisted magnetic recording head 1. FIG. 7 is a perspective view showing the thermally-assisted magnetic recording head 1. FIG. 8 shows a cross section taken along line 8-8 of FIG. 7. Note that FIG. 4 shows a cross section taken at the same position as that in FIG. 8. The thermally-assisted magnetic recording head 1 includes a slider 10 and a light source unit 150. FIG. 8 shows a state where the slider 10 and the light source unit 150 are separated from each other.

The slider 10 includes a slider substrate 11 and a head section 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head section 12 is disposed on the element-forming surface 11c. The medium facing surface 11a is processed so as to obtain an appropriate flying height of the slider 10 from the magnetic disk 201. The head section 12 has a medium facing surface 12a that faces the magnetic disk 201, and a rear surface 12b opposite to the medium facing surface 12a. The medium facing surface 12a is parallel to the medium facing surface 11a of the slider substrate 11. The slider 10 further includes a protective film 80 covering the medium facing surfaces 11a and 12a. The protective film 80 can be made of diamond-like carbon (DLC), for example. Note that FIG. 7 omits the illustration of the protective film 80. The protective film 80 is not an essential component of the slider 10 and can be dispensed with.

Where the components of the head section 12 are concerned, with respect to a reference position, a position located in a direction that extends perpendicular to the element-forming surface 11c and away from the element-forming surface 11c is defined as "above", and a position located in a direction opposite to the aforementioned direction is defined as "below". Where the layers included in the head section 12 are concerned, the surface closer to the element-forming surface 11c is defined as a "bottom surface," and the surface farther from the element-forming surface 11c is defined as a "top surface."

Moreover, X direction, Y direction, Z direction, −X direction, −Y direction, and −Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 8. The Z direction is a direction that extends perpendicular to the element-forming surface 11c and away from the element-forming surface 11c. The −X direction, the −Y direction, and the −Z direction are opposite to the X direction, the Y direction, and the Z direction, respectively. As viewed from the slider 10, the magnetic disk 201 travels in the Z direction. The slider 10 has an air inflow end (a leading end) at the end of the medium facing surface 11a in the −Z direction. The slider 10 has an air outflow end (a trailing end) at the end of the medium facing surface 12a in the Z direction. Track width direction TW is parallel to the Y direction.

The light source unit 150 includes a laser diode 160 serving as a light source for emitting laser light, and a support member 151 that is in the shape of a rectangular solid and supports the laser diode 160. The support member 151 is made of, for example, a ceramic material such as aluminum oxide-titanium carbide ($Al_2O_3$—TiC). The support member 151 has a bond surface 151a, a rear surface 151b opposite to the bond surface 151a, and four surfaces connecting the bond surface 151a to the rear surface 151b. One of the four surfaces connecting the bond surface 151a to the rear surface 151b is a light source mount surface 151c. The bond surface 151a is the surface to be bonded to the rear surface 11b of the slider substrate 11. The light source mount surface 151c is perpendicular to the bond surface 151a and parallel to the element-forming surface 11c. The laser diode 160 is mounted on the light source mount surface 151c. The support member 151 may function as a heat sink for dissipating heat generated by the laser diode 160, as well as serving to support the laser diode 160.

As shown in FIG. 4 and FIG. 8, the head section 12 includes: an insulating layer 13 disposed on the element-forming surface 11c; a heater 71 disposed on the insulating layer 13; an insulating layer 72 disposed to cover the insulating layer 13 and the heater 71; and a read head section 14, a write head section 16, and a protective layer 17 that are stacked in this order on the insulating layer 72. The insulating layers 13 and 72 and the protective layer 17 are each made of an insulating material such as $Al_2O_3$, which may hereinafter be referred to as alumina.

The heater 71 generates heat for causing part of the medium facing surface 12a to protrude. The components of the head section 12 expand with the heat generated by the heater 71, thereby causing part of the medium facing surface 12a to protrude. The heater 71 is made of a conductive material, such as metal, which generates heat when energized. The heater 71 is formed of, for example, a film of NiCr or a layered film consisting of Ta, NiCu, and Ta films. The amount of protrusion of the part of the medium facing surface 12a can be controlled by adjusting the magnitude of the current passed through the heater 71.

The read head section 14 includes: a bottom shield layer 21 disposed on the insulating layer 72; an MR element 22 disposed on the bottom shield layer 21; a top shield layer 23 disposed on the MR element 22; an insulating layer 24 disposed between the bottom shield layer 21 and the top shield layer 23 and surrounding the MR element 22; an insulating layer 25 disposed around the bottom shield layer 21; and an insulating layer 26 disposed around the top shield layer 23. The bottom shield layer 21 and the top shield layer 23 are each made of a soft magnetic material. The insulating layers 24 to 26 are each made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 22 is a TMR element or a CPP-type GMR element, the bottom shield layer 21 and the top shield layer 23 may also serve as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head section 12 further includes an insulating layer 27 disposed over the top shield layer 23 and the insulating layer 26. The insulating layer 27 is made of an insulating material such as alumina.

The write head section 16 is for use in perpendicular magnetic recording. The write head section 16 includes a return shield layer 28 disposed on the insulating layer 27, and an insulating layer 29 disposed on the insulating layer 27 and surrounding the return shield layer 28. The return shield layer 28 is made of a soft magnetic material. The return shield layer 28 has an end face located in the medium facing surface 12a. The top surfaces of the return shield layer 28 and the insulating layer 29 are even with each other.

The write head section 16 further includes a coupling layer 30 and coupling portions 31A and 31B disposed on the return shield layer 28, and a leading shield layer 36 disposed on the coupling layer 30. The coupling layer 30, the coupling portions 31A and 31B, and the leading shield layer 36 are each made of a soft magnetic material. Each of the coupling layer 30 and the leading shield layer 36 has an end face located in the medium facing surface 12a. The coupling portions 31A and 31B are located farther from the medium facing surface 12a than is the coupling layer 30. Each of the coupling portions 31A and 31B includes a first layer disposed on the return shield layer 28, and a second and a third layer stacked in this order on the first layer. The first layer of the coupling portion 31A and the first layer of the coupling portion 31B are arranged to align in the track width direction TW.

The write head section 16 further includes: an insulating layer 32 disposed over the return shield layer 28 and the insulating layer 29 and surrounding the coupling layer 30; a coil 33 disposed on the insulating layer 32; an insulating layer 34 disposed around the coupling layer 30 and the coil 33 and in the space between every adjacent turns of the coil 33; and an insulating layer 35 disposed over the coil 33 and the insulating layer 34 and surrounding the coupling layer 30. The first layers of the coupling portions 31A and 31B are embedded in the insulating layers 32, 34, and 35. The coil 33 is planar spiral-shaped and wound around the first layers of the coupling portions 31A and 31B. The coil 33 is made of a conductive material such as copper. The top surfaces of the coupling layer 30, the first layers of the coupling portions 31A and 31B, and the insulating layer 35 are even with each other.

Figure 3:
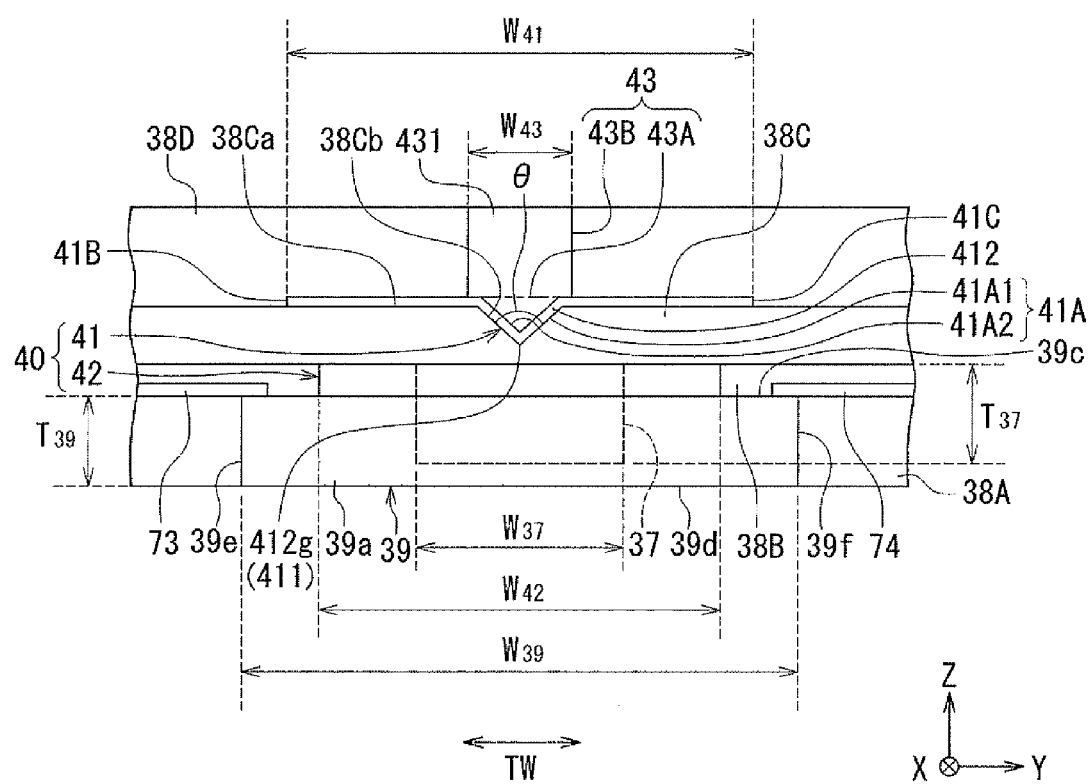
FIG. 3 is a front view showing part of the write head section of the thermally-assisted magnetic recording head according to the embodiment of the invention.

The write head section 16 further includes a waveguide including a core 37 and a cladding. The cladding includes cladding layers 38A, 38B, 38C, and 38D. The cladding layer 38A is disposed to cover the coupling layer 30, the leading shield layer 36, and the insulating layer 35. The core 37 is disposed on the cladding layer 38A. The cladding layer 38B is disposed on the cladding layer 38A and surrounds the core 37. The cladding layer 38B is not shown in FIG. 4 and FIG. 8 but is shown in FIG. 3, which will be described later. The cladding layer 38C is disposed over the core 37 and the cladding layer 38B. The cladding layer 38D is disposed on the cladding layer 38C.

The core 37 extends in the direction perpendicular to the medium facing surface 12a (the X direction). The core 37 has an incidence end 37a, and a front end face 37b opposite thereto. The front end face 37b faces toward the medium facing surface 12a and is located away from the medium facing surface 12a. The core 37 allows laser light that is emitted from the laser diode 160 and incident on the incidence end 37a to propagate through.

The core 37 is made of a dielectric material that transmits the laser light. Each of the cladding layers 38A, 38B, 38C, and 38D is made of a dielectric material and has a refractive index lower than that of the core 37. For example, if the laser light has a wavelength of 600 nm and the core 37 is made of $Al_2O_3$ (refractive index n=1.63), the cladding layers 38A, 38B, 38C, and 38D may be made of $SiO_2$ (refractive index n=1.46). If the core 37 is made of tantalum oxide such as $Ta_2O_5$ (n=2.16), the cladding layers 38A, 38B, 38C, and 38D may be made of $SiO_2$ (n=1.46) or $Al_2O_3$ (n=1.63). The core 37 will be described in more detail later.

The second layers of the coupling portions 31A and 31B are embedded in the cladding layers 38A and 38B. The second layer of the coupling portion 31A and the second layer of the coupling portion 31B are located on opposite sides of the core 37 in the track width direction TW, and are each spaced from the core 37.

The write head section 16 further includes: a protruding member 39 disposed between the front end face 37b of the core 37 and the medium facing surface 12a; a plasmon generator 40 disposed near the medium facing surface 12a and including a portion located above the core 37; and a magnetic pole 43 disposed such that the portion of the plasmon generator 40 is interposed between the magnetic pole 43 and the core 37. The plasmon generator 40 is formed of a conductive material such as a metal. The material that forms the plasmon generator 40 may contain one of Au, Ag, Al, and Cu, for example. The magnetic pole 43 is formed of a soft magnetic material, or a magnetic metal material in particular. The material that forms the magnetic pole 43 may contain one of Ni, Fe, and Co, for example. The protruding member 39 is formed of a metal that is different from both the material that forms the magnetic pole 43 and the material that forms the plasmon generator 40. The protruding member 39, the plasmon generator 40, and the magnetic pole 43 will be described in more detail later.

The write head section 16 further includes a coupling layer 44 disposed on the magnetic pole 43, and an insulating layer 45 disposed on the cladding layer 38D and surrounding the coupling layer 44. The third layers of the coupling portions 31A and 31B are embedded in the cladding layers 38C and 38D and the insulating layer 45. The write head section 16 further includes a coupling layer 46 disposed over the third layers of the coupling portions 31A and 31B and the insulating layer 45. The coupling layers 44 and 46 are each made of a soft magnetic material.

The write head section 16 further includes: a coil 47 disposed on the insulating layer 45; an insulating layer 48 disposed around the coupling layer 46 and the coil 47 and in the space between every adjacent turns of the coil 47; and an insulating layer 49 disposed over the coil 47 and the insulating layer 48 and surrounding the coupling layers 44 and 46. The coil 47 is planar spiral-shaped and wound around the coupling layer 46. The coil 47 is made of a conductive material such as copper. The top surfaces of the coupling layers 44 and 46 and the insulating layer 49 are even with each other.

The write head section 16 further includes a yoke layer 50 and an insulating layer 51. The yoke layer 50 is disposed over the coupling layers 44 and 46 and the insulating layer 49. The yoke layer 50 is in contact with the top surface of the coupling layer 44 at a position near the medium facing surface 12a, and in contact with the top surface of the coupling layer 46 at a position away from the medium facing surface 12a. The yoke layer 50 is made of a soft magnetic material. The insulating layer 51 is disposed on the insulating layer 49 and surrounds the yoke layer 50. In the write head section 16, a magnetic path for passing magnetic fluxes corresponding to the magnetic fields produced by the coils 33 and 47 is formed by the leading shield layer 36, the coupling layer 30, the return shield layer 28, the coupling portions 31A and 31B, the coupling layer 46, the yoke layer 50, the coupling layer 44, and the magnetic pole 43. The coils 33 and 47 produce magnetic fields corresponding to data to be written on the magnetic disk 201. The coils 33 and 47 are connected in series or in parallel so that the magnetic flux corresponding to the magnetic field produced by the coil 33 and the magnetic flux corresponding to the magnetic field produced by the coil 47 flow in the same direction through the magnetic pole 43. The magnetic pole 43 has an end face located in the medium facing surface 12a. The magnetic pole 43 allows the magnetic flux corresponding to the magnetic field produced by the coil 33 and the magnetic flux corresponding to the magnetic field produced by the coil 47 to pass, and produces a write magnetic field for writing data on the magnetic disk 201.

As shown in FIG. 4 and FIG. 8, the protective layer 17 is disposed to cover the write head section 16. As shown in FIG. 7, the head section 12 further includes a plurality of terminals 18 disposed on the top surface of the protective layer 17. The plurality of terminals 18 are electrically connected to the MR element 22, the coils 33 and 47, the protruding member 39 and the heater 71, and are also electrically connected to the plurality of pad-shaped terminals of the wiring member 224 shown in FIG. 6.

The laser diode 160 may be a laser diode of InP type, GaAs type, GaN type or the like that is commonly used for such applications as communications, optical disc storage and material analysis. The laser diode 160 may emit laser light of any wavelength within the range of, for example, 375 nm to 1.7 μm Specifically, the laser diode 160 may be an InGaAsP/InP quarternary mixed crystal laser diode having an emittable wavelength range of 1.2 to 1.67 μm, for example.

As shown in FIG. 8, the laser diode 160 has a multilayer structure including a lower electrode 161, an active layer 162, and an upper electrode 163. A reflecting layer 164 made of, for example, SiO$_2$ or Al$_2$O$_3$, is formed on two cleavage planes of the multilayer structure so as to excite oscillation by total reflection of light. The reflecting layer 164 has an opening for emitting laser light in the position of the active layer 162 including an emission center 162a.

The light source unit 150 further includes a terminal 152 disposed on the light source mount surface 151c and electrically connected to the lower electrode 161, and a terminal 153 disposed on the light source mount surface 151c and electrically connected to the upper electrode 163. These terminals 152 and 153 are electrically connected to the plurality of pad-shaped terminals of the wiring member 224 shown in FIG. 6. When a predetermined voltage is applied to the laser diode 160 through the terminals 152 and 153, laser light is emitted from the emission center 162a of the laser diode 160. The laser light emitted from the laser diode 160 is preferably TM-mode polarized light whose electric field oscillates in a direction perpendicular to the plane of the active layer 162.

The laser diode 160 can be driven by a power supply inside the magnetic disk drive. The magnetic disk drive usually includes a power supply that generates a voltage of 5 V or so, for example. This supply voltage is sufficient to drive the laser diode 160. The laser diode 160 has a power consumption of, for example, several tens of milliwatts or so, which can be adequately covered by the power supply in the magnetic disk drive.

The light source unit 150 is secured to the slider 10 by bonding the bond surface 151a of the support member 151 to the rear surface 11b of the slider substrate 11, as shown in FIG. 8. The laser diode 160 and the core 37 are positioned with respect to each other so that the laser light emitted from the laser diode 160 will be incident on the incidence end 37a of the core 37.

Figure 1:
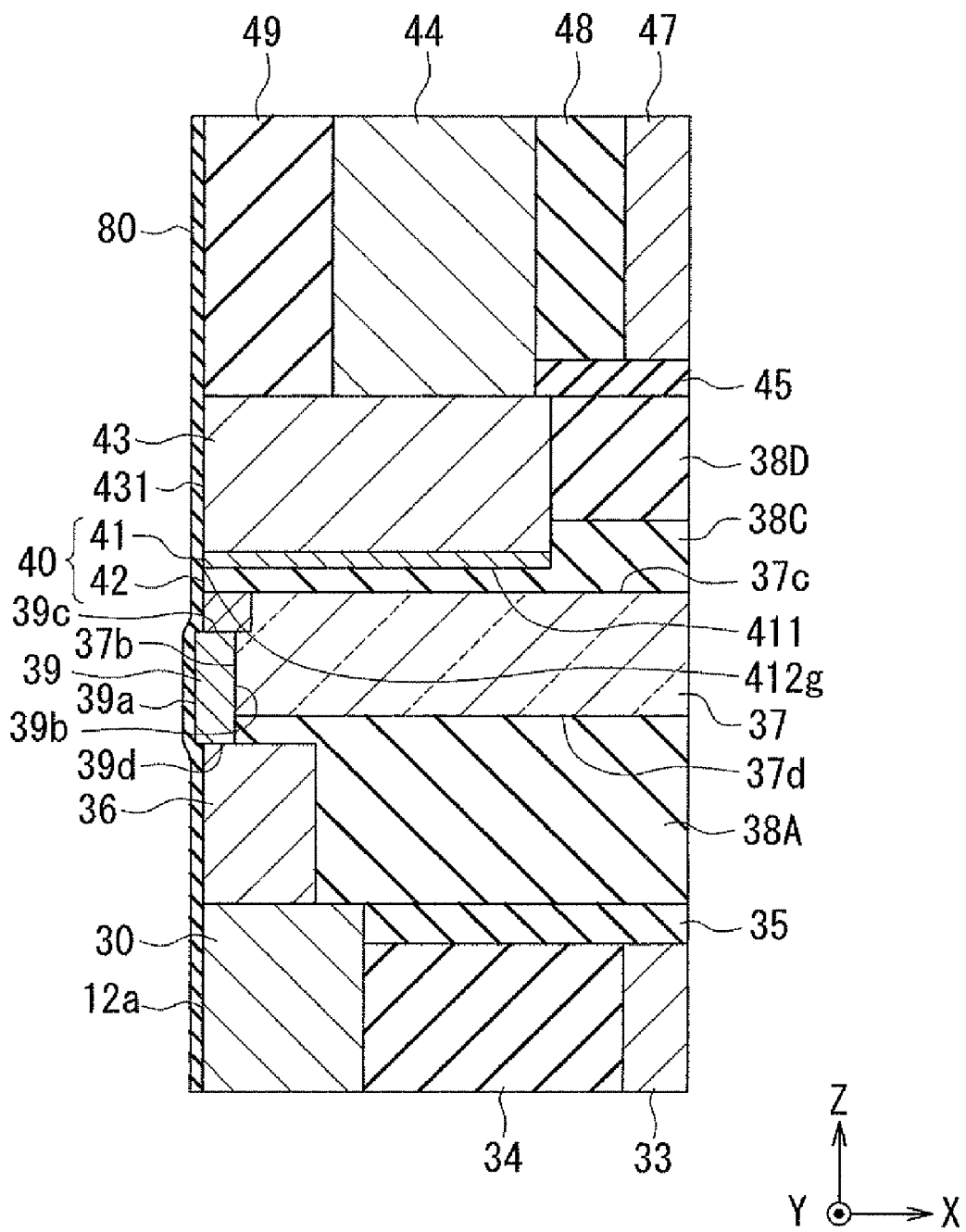
FIG. 1 is a cross-sectional view showing part of a write head section of a thermally-assisted magnetic recording head according to an embodiment of the invention.

The core 37, the protruding member 39, the plasmon generator 40, and the magnetic pole 43 will now be described in detail with reference to FIG. 1, FIG. 3, and FIG. 4. FIG. 1 is a cross-sectional view showing part of the write head section 16 of the thermally-assisted magnetic recording head 1. FIG. 1 shows a cross section perpendicular to the element-forming surface 11c and the medium facing surface 12a. FIG. 3 is a front view showing part of the write head section 16 of the thermally-assisted magnetic recording head 1. FIG. 3 shows part of the medium facing surface 12a. In the following description, the plasmon generator 40 and the magnetic pole 43 will be referred to as the main portion of the write head section 16.

The core 37 has an evanescent light generating surface 37c which is a top surface, and has a bottom surface 37d and two side surfaces in addition to the incidence end 37a and the front end face 37b shown in FIG. 4 and FIG. 8. The evanescent light generating surface 37c generates evanescent light based on the light propagating through the core 37. The evanescent light generating surface 37c is perpendicular to the Z direction.

The protruding member 39 is shaped like a rectangular solid that is long in the Y direction, and is disposed between the front end face 37b of the core 37 and the medium facing surface 12a. The protruding member 39 has a first end face 39a located in the medium facing surface 12a, a second end face 39b facing toward the front end face 37b of the core 37, a top end face 39c, a bottom end face 39d opposite to the top end face 39c, and two side end faces 39e and 39f located at opposite ends in the Y direction. The second end face 39b is opposed to at least a portion of the front end face 37b of the core 37. In the example shown in FIG. 1, the second end face 39b is in contact with the front end face 37b of the core 37; however, a light-transmitting material may be interposed between the second end face 39b and the front end face 37b. The bottom end face 39d of the protruding member 39 may or may not be in contact with the top surface of the leading shield layer 36. The bottom end face 39d of the protruding member 39 and the bottom surface 37d of the core 37 may differ in level or may be flush with each other.

As shown in FIG. 3, the write head section 16 has a pair of lead layers 73 and 74 electrically connected to the protruding member 39. The lead layers 73 and 74 are provided for supplying a current to the protruding member 39, and are made of a conductive material such as copper. The lead layers 73 and 74 are disposed between the cladding layer 38A and the cladding layer 38B. The lead layers 73 and 74 are electrically connected to two of the plurality of terminals 18 shown in FIG. 7. The lead layers 73 and 74 correspond to a pair of leads according to the invention.

The plasmon generator 40 includes a first portion 41 and a second portion 42. The core 37 and the second portion 42 are located on the same side in the direction perpendicular to the evanescent light generating surface 37c (the Z direction) relative to the first portion 41. In the embodiment, in particular, the core 37 and the second portion 42 are located backward in the Z direction (located on the leading end side) relative to the first portion 41. The second portion 42 is located forward in the Z direction (located on the trailing end side) relative to the protruding member 39. A portion of the cladding layer 38C is interposed between the first portion 41 and each of the core 37 and the second portion 42.

The second portion 42 is shaped like a rectangular solid that is long in the Y direction, and is disposed between the front end face 37b of the core 37 and the medium facing surface 12a. The second portion 42 has a front end face located in the medium facing surface 12a, a rear end face facing toward the front end face 37b of the core 37, a top end face, a bottom end face opposite to the top end face, and two side end faces located at opposite ends in the Y direction. The rear end face of the second portion 42 is opposed to another portion of the front end face 37b of the core 37. The top end face of the second portion 42 and the evanescent light generating surface 37c may be flush with each other or differ in level. The bottom end face of the second portion 42 may or may not be in contact with the top end face 39c of the protruding member 39.

As shown in FIG. 1 and FIG. 3, the first portion 41 includes a plasmon exciting part 411 and a front end face 412. The plasmon exciting part 411 faces the evanescent light generating surface 37c of the core 37 with a predetermined spacing therebetween. The front end face 412 is located in the medium facing surface 12a. A portion of the cladding layer 38C is interposed between the evanescent light generating surface 37c and the plasmon exciting part 411. Surface plasmons are excited on the plasmon exciting part 411 through coupling with the evanescent light generated from the evanescent light generating surface 37c.

As shown in FIG. 3, the cladding layer 38C has a top surface 38Ca located above the core 37, and a groove 38Cb that opens in the top surface 38Ca and is located above the core 37. The groove 38Cb extends in the direction perpendicular to the medium facing surface 12a (the X direction). The groove 38Cb is V-shaped in cross section parallel to the medium facing surface 12a.

As shown in FIG. 3, the first portion 41 has a V-shaped portion 41A that includes part of the front end face 412 and the plasmon exciting part 411. The V-shaped portion 41A extends in the direction perpendicular to the medium facing surface 12a (the X direction). The groove 38Cb mentioned above is to accommodate the V-shaped portion 41A.

The V-shaped portion 41A has a first sidewall part 41A1 and a second sidewall part 41A2 that are each connected to the plasmon exciting part 411 and that increase in distance from each other with increasing distance from the plasmon exciting part 411. The first and second sidewall parts 41A1 and 41A2 are each shaped like a plate. The first and second sidewall parts 41A1 and 41A2 are connected to each other so that the connected first and second sidewall parts 41A1 and 41A2 have a V-shaped cross section parallel to the medium facing surface 12a. The plasmon exciting part 411 is formed of an edge of the connected first and second sidewall parts 41A1 and 41A2, the edge being located at an end closest to the evanescent light generating surface 37c.

The first portion 41 further has an extended portion 41B that is connected to an end portion of the first sidewall part 41A1 opposite from the plasmon exciting part 411, and an extended portion 41C that is connected to an end portion of the second sidewall part 41A2 opposite from the plasmon exciting part 411. From the end portion of the first sidewall part 41A1 opposite from the plasmon exciting part 411, the extended portion 41B extends parallel to the evanescent light generating surface 37c and away from both the first and second sidewall parts 41A1 and 41A2 (in the −Y direction). From the end portion of the second sidewall part 41A2 opposite from the plasmon exciting part 411, the extended portion 41C extends parallel to the evanescent light generating surface 37c and away from both the first and second sidewall parts 41A1 and 41A2 (in the Y direction). As viewed from above, the outer edges of the extended portions 41B and 41C lie outside the outer edges of the magnetic pole 43.

The front end face 412 has a near-field light generating part 412g located at an end of the plasmon exciting part 411. The near-field light generating part 412g generates near-field light based on the surface plasmons excited on the plasmon exciting part 411.

The magnetic pole 43 includes a first portion 43A and a second portion 43B. At least part of the first portion 43A is accommodated in the space defined by the V-shaped portion 41A. The second portion 43B is located farther from the evanescent light generating surface 37c of the core 37 than is the first portion 43A. In FIG. 3, the boundary between the first portion 43A and the second portion 43B is shown by a chain double-dashed line. As shown in FIG. 1 and FIG. 3, the magnetic pole 43 has an end face 431 located in the medium facing surface 12a.

The first portion 43A is triangular-prism-shaped, and is in contact with the first and second sidewall parts 41A1 and 41A2. The second portion 43B is rectangular-solid-shaped, and is in contact with the extended portions 41B and 41C. The second portion 43B is greater than the first portion 43A in width in the direction parallel to the medium facing surface 12a and the evanescent light generating surface 37c (the Y direction).

As will be described in detail later, the protruding member 39 is configured so that the light received at the second end face 39b causes the protruding member 39 to be heated and expanded to cause the first end face 39a to get protruded toward the magnetic disk 201. In the embodiment, as shown in FIG. 1, when the protruding member 39 is not heated and expanded, the first end face 39a of the protruding member 39 is in a protruded state toward the magnetic disk 201, i.e., leftward in FIG. 1, relative to the end face 431 of the magnetic pole 43 and the near-field light generating part 412g. The amount of protrusion of the first end face 39a relative to the end face 431 of the magnetic pole 43 and the near-field light generating part 412g falls within the range of 0.5 to 2.5 nm, for example.

As shown in FIG. 3, the width of the front end face 37b of the core 37 in the track width direction TW (the Y direction) will be represented by the symbol $W_{37}$, and the dimension of the front end face 37b in the Z direction will be represented by the symbol $T_{37}$. $W_{37}$ falls within the range of 0.3 to 1 for example. The core 37 excluding a portion thereof in the vicinity of the plasmon generator 40 may have a width greater than $W_{37}$. $T_{37}$ falls within the range of 0.3 to 0.6 μm, for example.

The dimension of the V-shaped portion 41A of the first portion 41 of the plasmon generator 40 in the direction perpendicular to the evanescent light generating surface 37c (the Z direction) and that in the track width direction TW (the Y direction) are both sufficiently smaller than the wavelength of the laser light to propagate through the core 37. An angle θ (see FIG. 3) within the range of 30 to 120 degrees, for example, is formed between the two surfaces of the V-shaped portion 41A that are located on opposite sides in the track width direction TW.

As shown in FIG. 3, the dimension of the first portion 41 in the track width direction TW (the Y direction) at the medium facing surface 12a will be represented by the symbol $W_{41}$. $W_{41}$ falls within the range of 0.1 to 20 μm, for example. The dimension of the first portion 41 in the track width direction TW (the Y direction) may be constant regardless of the distance from the medium facing surface 12a, or may become greater than $W_{41}$ at positions away from the medium facing surface 12a.

The length of the first portion 41 in the X direction is in the range of 0.8 to 2.0 μm, for example. The X-direction length of the portion of the plasmon exciting part 411 of the first portion 41 opposed to the evanescent light generating surface 37c and the distance between the plasmon exciting part 411 and the evanescent light generating surface 37c are both important parameters in achieving appropriate excitation and propagation of surface plasmons. The X-direction length of the portion of the plasmon exciting part 411 of the first portion 41 opposed to the evanescent light generating surface 37c falls within the range of 0.8 to 2.0 μm, for example. The distance between the plasmon exciting part 411 and the evanescent light generating surface 37c falls within the range of 10 to 80 nm, for example. The distance between the plasmon exciting part 411 and the top end face of the second portion 42 of the plasmon generator 40 falls within the range of 10 to 40 nm, for example.

The distance between the near-field light generating part 412g and the end face 431 of the magnetic pole 43 on a virtual straight line passing through the near-field light generating part 412g and extending in the Z direction falls within the range of 10 to 70 nm, for example.

As shown in FIG. 3, the dimension of the second portion 42 of the plasmon generator 40 in the track width direction TW (the Y direction) at the medium facing surface 12a will be represented by the symbol $W_{42}$. $W_{42}$ falls within the range of 0.3 to 20 μm, for example. The dimension of the second portion 42 in the X direction falls within the range of 40 to 80 nm, for example. The dimension of the second portion 42 in the Z direction is smaller than ½ $T_{37}$, and falls within the range of 50 to 200 nm, for example. The rear end face of the second portion 42 is opposed to a portion of the front end face 37b of the core 37, the portion having an area smaller than 50% of the entire area of the front end face 37b.

The width of the magnetic pole 43 in the track width direction TW (the Y direction) at the medium facing surface 12a will be represented by the symbol $W_{43}$. $W_{43}$ falls within the range of 0.1 to 0.5 μm, for example.

The width of the protruding member 39 in the track width direction TW (the Y direction) at the medium facing surface 12a, i.e., the width of the first end face 39a in the track width direction TW (the Y direction), will be represented by the symbol $W_{39}$. At the medium facing surface 12a, the protruding member 39 is greater than the magnetic pole 43 and the plasmon generator 40 in width in the track width direction TW (the Y direction). That is, $W_{39}$ is greater than $W_{41}$, $W_{42}$, and $W_{43}$. $W_{39}$ is also greater than the width $W_{37}$ of the front end face 37b of the core 37 in the track width direction TW (the Y direction). $W_{39}$ falls within the range of 0.5 to 40 μm, for example.

The dimension of the first and second end faces 39a and 39b of the protruding member 39 in the Z direction will be represented by the symbol $T_{39}$. $T_{39}$ falls within the range of 0.15 to 0.5 μm, for example. The second end face 39b is opposed to at least part of the front end face 37b of the core 37, the at least part having an area greater than 50% of the entire area of the front end face 37b. In the embodiment, in particular, the second end face 39b is opposed to a portion of the front end face 37b at least from the bottom end to above the center of the front end face 37b in the Z direction.

Reference is now made to FIG. 1, FIG. 4, and FIG. 8 to describe the principle of generation of near-field light in the embodiment and the principle of thermally-assisted magnetic recording using the near-field light. Laser light emitted from the laser diode 160 propagates through the core 37 of the waveguide to reach the vicinity of the plasmon generator 40. The plasmon generator 40 is configured so that surface plasmons are excited on the plasmon generator 40 based on the light propagating through the core 37 and the near-field light generating part 412g generates near-field light based on the surface plasmons. More specifically, in the core 37, the laser light is totally reflected at the evanescent light generating surface 37c to cause evanescent light to occur from the evanescent light generating surface 37c and permeate into the cladding layer 38C. Then, surface plasmons are excited on the plasmon exciting part 411 of the first portion 41 of the plasmon generator 40 through coupling with the evanescent light. The surface plasmons propagate along the plasmon exciting part 411 to the near-field light generating part 412g. Consequently, the surface plasmons concentrate at the near-field light generating part 412g, and the near-field light generating part 412g generates near-field light based on the surface plasmons.

The near-field light is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 43 for data writing.

The role of the second portion 42 of the plasmon generator 40 will now be described. Based on the principle described above, in the first portion 41 of the plasmon generator 40, surface plasmons are excited on the plasmon exciting part 411 through coupling with the evanescent light that occurs from the evanescent light generating surface 37c of the core 37. The surface plasmons propagate along the plasmon exciting part 411 to the near-field light generating part 412g, and near-field light is generated from the near-field light generating part 412g based on the surface plasmons. The surface plasmons include multiple electric dipoles induced by the evanescent light. At the near-field light generating part 412g, the near-field light is generated by the electric lines of force of the electric dipoles.

In the embodiment, the second portion 42 is located near the medium facing surface 12a. The second portion 42 has the top end face that faces the plasmon exciting part 411 of the first portion 41. Since the top end face of the second portion 42 is located close to the plasmon exciting part 411, electric dipoles (surface plasmons) are induced also on the top end face of the second portion 42. Then, in the vicinity of the medium facing surface 12a, the electric lines of force produced by the electric dipoles on the top end face of the second portion 42 and the electric lines of force produced by the electric dipoles on the plasmon exciting part 411 and its vicinity are coupled with each other via part of the cladding layer 38C which is a dielectric. This allows for producing electric lines of force of high densities, in other words, strong electric fields, in the vicinity of the top end face of the second portion 42 and the plasmon exciting part 411. As a result, it is possible to increase the strength of the near-field light generated from the near-field light generating part 412g.

In this manner, the plasmon generator 40 having the second portion 42 can increase the strength of the near-field light generated from the near-field light generating part 412g. However, as the aforementioned principle teaches, near-field light can be generated from the near-field light generating part 412g without the second portion 42. Thus, the plasmon generator 40 may have only the first portion 41 without the second portion 42.

Figure 2:
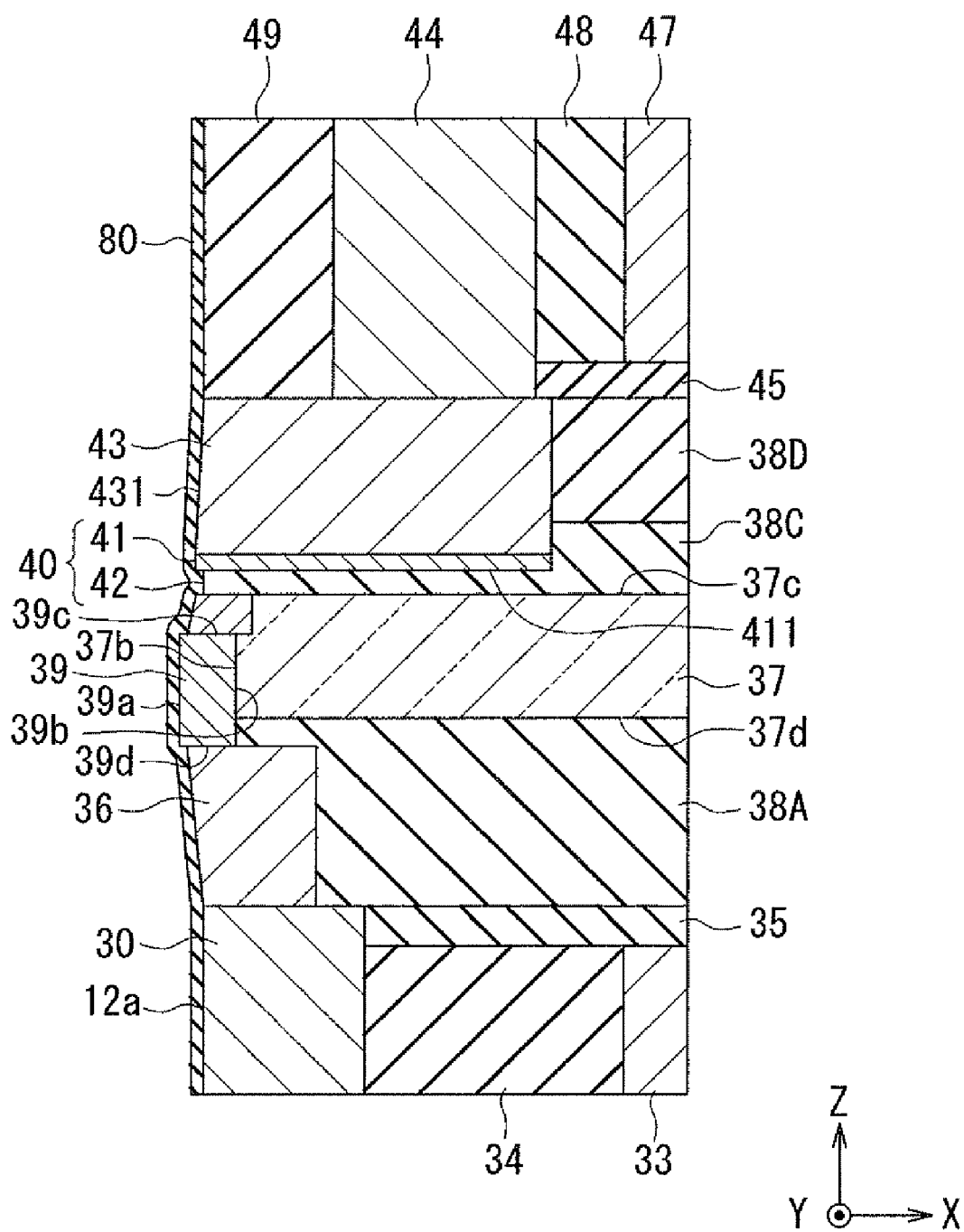
FIG. 2 is a cross-sectional view showing the operation of a protruding member of the thermally-assisted magnetic recording head according to the embodiment of the invention.

Reference is now made to FIG. 1 to FIG. 3 to describe a first function of the protruding member 39. FIG. 2 is a cross-sectional view showing the operation of the protruding member 39. Note that FIG. 2 shows a cross section perpendicular to the element-forming surface 11c and the medium facing surface 12a.

During the write operation of the thermally-assisted magnetic recording head 1, the laser light emitted from the laser diode 160 enters the core 37 and propagates through the core 37. Part of the laser light having propagated through the core 37 passes through the front end face 37b. The second end face 39b of the protruding member 39 faces toward the front end face 37b of the core 37 so as to receive the laser light that has propagated through the core 37 and passed through the front end face 37b. The protruding member 39 is heated and expanded by the light received at the second end face 39b, so that the first end face 39a gets protruded toward the magnetic disk 201. This will be referred to as the first feature of the protruding member 39. FIG. 1 shows the protruding member 39 in the non-expanded state. FIG. 2 shows the protruding member 39 in an expanded state.

In the embodiment, when the protruding member 39 is not heated and expanded, the first end face 39a of the protruding member 39 is in a protruded state toward the magnetic disk 201 relative to the end face 431 of the magnetic pole 43 and the near-field light generating part 412g. This will be referred to as the second feature of the protruding member 39.

In the embodiment, the medium facing surface 12a including the first end face 39a is covered with and protected by the protective film 80. Because of the second feature of the protruding member 39, when the protruding member 39 is not heated and expanded, part of the protective film 80 in the vicinity of the first end face 39a is in a protruded state toward the magnetic disk 201. On the other hand, because of the first feature of the protruding member 39, when the first end face 39a gets protruded toward the magnetic disk 201, part of the protective film 80 in the vicinity of the first end face 39a also gets protruded toward the magnetic disk 201. Consequently, according to the embodiment, when the protective film 80 comes into contact with the surface of the magnetic disk 201 or a dust particle, a portion of the protective film 80 in the vicinity of the main portion of the write head section 16 will not contact the surface of the magnetic disk 201 or the dust particle, but a portion of the protective film 80 in the vicinity of the protruding member 39 is more likely to contact the surface of the magnetic disk 201 or the dust particle. The embodiment thus makes it possible to protect the main portion of the write head section 16 even when part of the medium facing surface 12a corresponding to the main portion of the write head section 16 gets protruded. This advantageous effect will be described in more detail later.

Now, a description will be given of the metal that forms the protruding member 39. The metal that forms the protruding member 39 preferably satisfies any of first to third conditions described below. The first condition is that, where the material that forms the magnetic pole 43 contains one of Ni, Fe, and Co and the material that forms the plasmon generator 40 contains one of Au, Ag, Al and Cu, the metal that forms the protruding member 39 should be lower in etching rate than Au, Ag, Al, Cu, Ni, Fe, and Co when etched by ion beam etching using oxygen ion beams at an incident angle of 45° or greater. This makes it possible that, when the protruding member 39 is not heated and expanded, the first end face 39a of the protruding member 39 is in a protruded state toward the magnetic disk 201 relative to the end face 431 of the magnetic pole 43 and the near-field light generating part 412g. The reason for this will be described in detail later.

The second condition is that the metal that forms the protruding member 39 should have a Mohs' hardness of 6 or more. Where the metal that forms the protruding member 39 satisfies the second condition, it is possible to prevent the protruding member 39 from being scratched upon contact with the surface of the magnetic disk 201 or a dust particle when the first end face 39a is not covered with and protected by the protective film 80. Note that the state of the first end face 39a not covered with and protected by the protective film 80 includes a state where the protective film 80 is not provided and a state where part of the protective film 80 is damaged to cause the first end face 39a to be exposed.

The third condition is that the metal that forms the protruding member 39 should have a melting point of 1100° C. or higher. Where the metal that forms the protruding member 39 satisfies the third condition, it is possible to prevent the protruding member 39 from melting due to frictional heat upon contact with the surface of the magnetic disk 201 or a dust particle when the first end face 39a is not covered with and protected by the protective film 80.

The metal that forms protruding member 39 should preferably satisfy one or more of the first to third conditions. The metal that forms the protruding member 39 may be one of Cr, Ti, Ta, V, and Nb. Cr, Ti, Ta, V, and Nb satisfy all of the first to third conditions if the material that forms the magnetic pole 43 contains one of Ni, Fe and Co and the material that forms the plasmon generator 40 contains one of Au, Ag, Al and Cu.

A second function of the protruding member 39 will now be described. As shown in FIG. 3, the pair of lead layers 73 and 74 are electrically connected to the protruding member 39. A current can be supplied to the protruding member 39 through the lead layers 73 and 74. The metal that forms the protruding member 39 varies in resistance in response to changes in temperature. Consequently, according to the embodiment, the protruding member 39 can be used to detect a contact of the thermally-assisted magnetic recording head 1 with the surface of the magnetic disk 201, as will be described below.

When the protective film 80 comes into contact with the surface of the magnetic disk 201, the frictional heat resulting from the contact raises the temperature of the protective film 80 at and in the vicinity of the part in contact with the surface of the magnetic disk 201. In the embodiment, when the thermally-assisted magnetic recording head 1 contacts the surface of the magnetic disk 201, the aforementioned first and second features of the protruding member 39 cause part of the protective film 80 in the vicinity of the first end face 39a of the protruding member 39 to be first brought into contact with the surface of the magnetic disk 201. This raises the temperature of the protruding member 39 and thereby changes the resistance of the protruding member 39. Measuring the resistance of the protruding member 39 or any parameter corresponding thereto thus allows for detecting that the thermally-assisted magnetic recording head 1 has come into contact with the surface of the magnetic disk 201. The protruding member 39 is energized through the lead layers 73 and 74. A change in resistance of the protruding member 39 is detected, for example, as a change in voltage drop in the protruding member 39. If the protruding member 39 has a positive temperature coefficient of resistance, the temperature and the resistance of the protruding member 39 suddenly rise when the protective film 80 comes into contact with the surface of the magnetic disk 201. As a result, with a constant current flowing through the protruding member 39, the protruding member 39 experiences a sudden increase in voltage drop.

Figure 9:
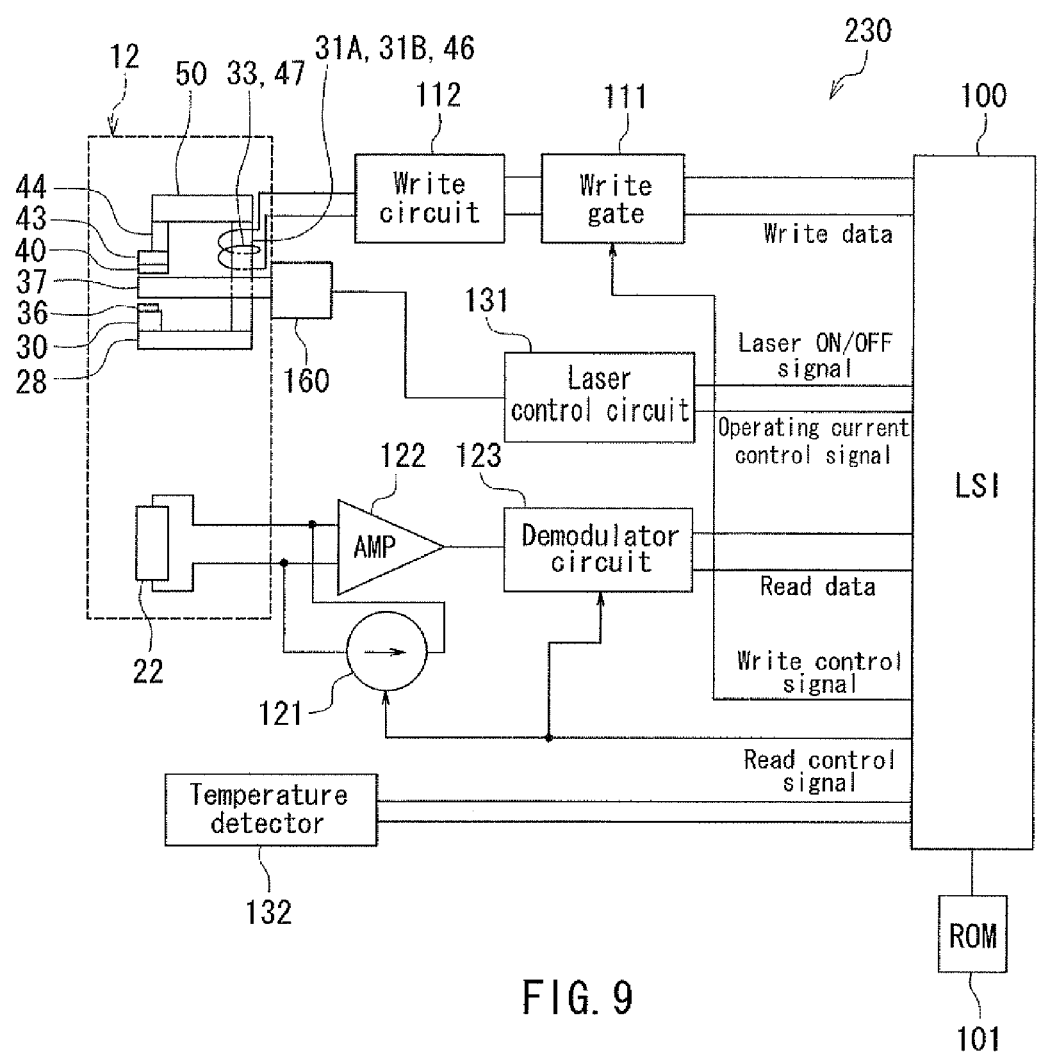
FIG. 9 is a block diagram showing the circuit configuration of the magnetic recording device according to the embodiment of the invention.

Reference is now made to FIG. 9 to describe the circuit configuration of the control circuit 230 shown in FIG. 5 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coils 33 and 47.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 160 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 160.

In a write operation, the control LSI 100 supplies write data to the write gate 111. The write gate 111 supplies the write data to the write circuit 112 only when the write control signal indicates a write operation. According to the write data, the write circuit 112 passes a write current through the coils 33 and 47. Consequently, the magnetic pole 43 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 160 on the basis of the laser ON/OFF signal, and also controls the value of the operating current to be supplied to the laser diode 160 on the basis of the operating current control signal. When the laser ON/OFF signal indicates an ON operation, the laser control circuit 131 exercises control so that an operating current at or above an oscillation threshold is supplied to the laser diode 160. Consequently, the laser diode 160 emits laser light, and the laser light propagates through the core 37. Then, according to the principle of generation of near-field light described previously, near-field light is generated from the near-field light generating part 412g of the first portion 41 of the plasmon generator 40. The near-field light heats a part of the magnetic recording layer of the magnetic disk 201, thereby lowering the coercivity of that part. When writing, the part of the magnetic recording layer with the lowered coercivity is subjected to the write magnetic field produced by the magnetic pole 43 for data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 160. Using the operating current control signal, the control LSI 100 controls the laser control circuit 131 so that the operating current of that value is supplied to the laser diode 160. The control table contains, for example, data that indicates the oscillation threshold and the temperature dependence of the light output versus operating current characteristic of the laser diode 160. The control table may further contain data that indicates the relationship between the operating current value and a temperature increase of the magnetic recording layer heated by the near-field light, and data that indicates the temperature dependence of the coercivity of the magnetic recording layer.

As shown in FIG. 9, the control circuit 230 has the signal system for controlling the laser diode 160, i.e., the signal system consisting of the laser ON/OFF signal and the operating current control signal, independent of the control signal system intended for read/write operations. This configuration makes it possible to implement various modes of energization of the laser diode 160, not only to energize the laser diode 160 simply in association with a write operation. It should be noted that the control circuit 230 may have any configuration other than the configuration shown in FIG. 9.

Now, a description will be given of a method of manufacturing the thermally-assisted magnetic recording head 1 according to the embodiment. The method of manufacturing the thermally-assisted magnetic recording head 1 includes the steps of: manufacturing the slider 10; and securing the light source unit 150 onto the slider 10. Here, a method of manufacturing the slider 10 will be described briefly. The method of manufacturing the slider 10 includes the steps of: forming components of a plurality of sliders 10 except the slider substrates 11 on a substrate that includes portions to become the slider substrates 11 of the plurality of sliders 10, thereby fabricating a substructure including a plurality of pre-slider portions aligned in rows, the plurality of pre-slider portions being intended to become individual sliders 10 later; and cutting the substructure to separate the plurality of pre-slider portions from each other into the plurality of sliders 10.

Figure 10:
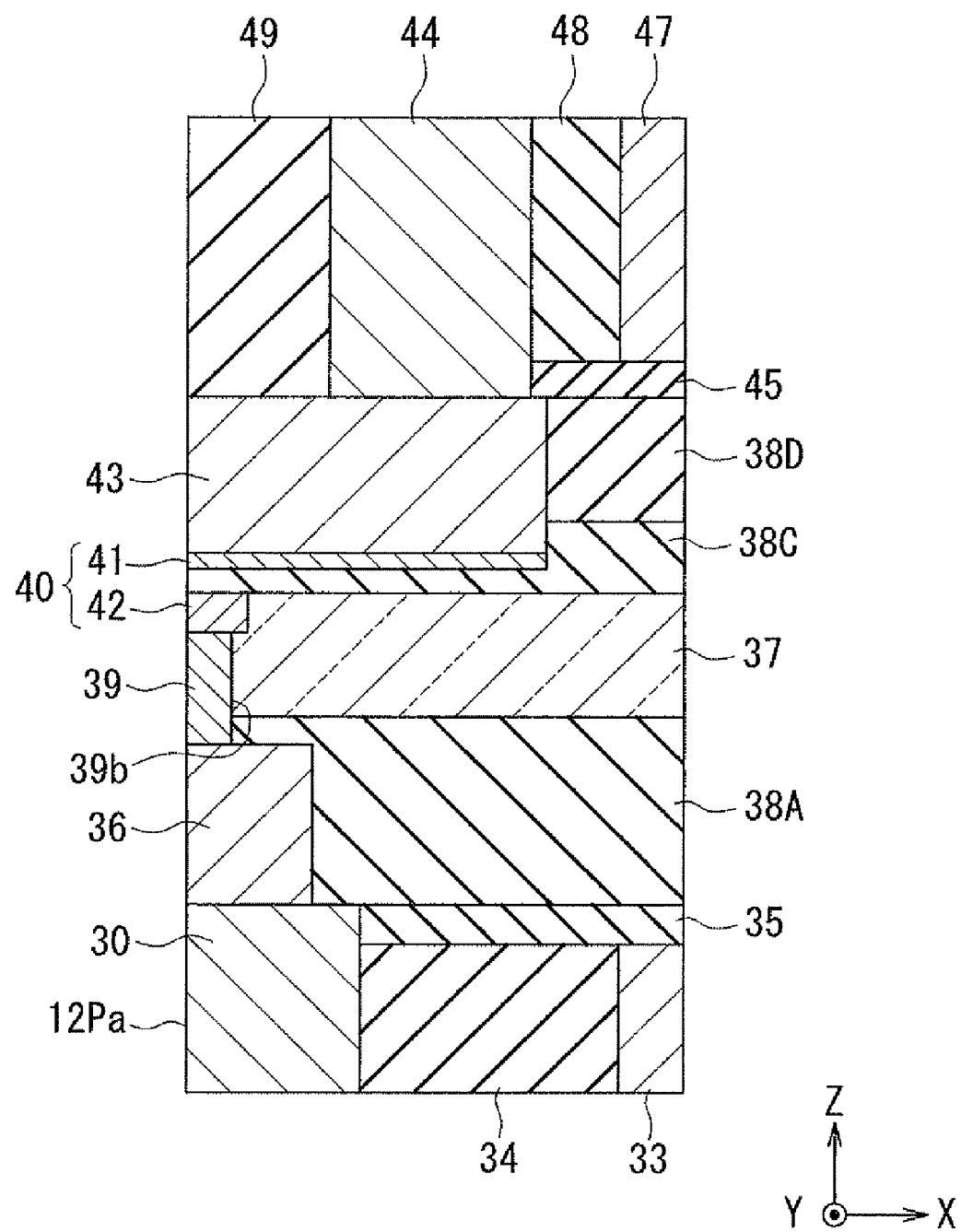
FIG. 10 is a cross-sectional view showing a step of a method of manufacturing the thermally-assisted magnetic recording head according to the embodiment of the invention.
Figure 11:
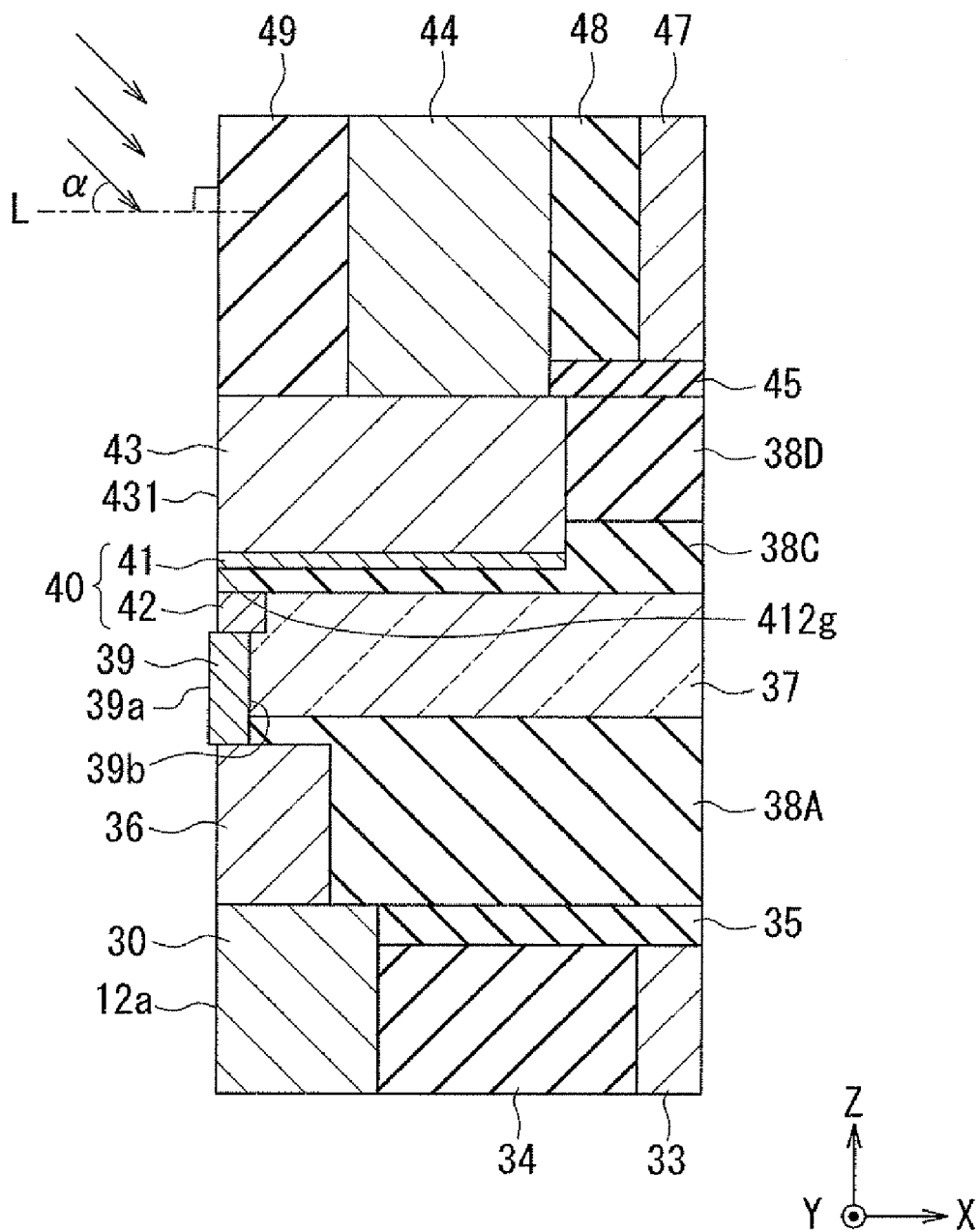
FIG. 11 is a cross-sectional view showing a step that follows the step shown in FIG. 10.

Reference is now made to FIG. 10 and FIG. 11 to describe the process to follow the cutting of the substructure. FIG. 10 and FIG. 11 are cross-sectional views each showing part of a stack of layers fabricated in the process of manufacturing the thermally-assisted magnetic recording head 1.

FIG. 10 shows a step that follows the cutting of the substructure. In this step, the cut surface is polished. The surface that is formed by the polishing and is to be etched later into the medium facing surface 12a will hereinafter be referred to as the surface to be etched, and represented by the symbol 12 Pa.

FIG. 11 shows the next step. In this step, first, the surface to be etched 12 Pa is etched by ion beam etching using oxygen ion beams. This etching is performed to remove smears that have resulted from extending waste particles produced by polishing a metal material when forming the surface to be etched 12 Pa by polishing. This causes the surface to be etched 12 Pa to be slightly etched to become the medium facing surface 12a. In this step, the metal material exposed in the medium facing surface 12a may be slightly oxidized. Next, the protective film 80 is formed to cover the medium facing surface 12a and the medium facing surface 11a (see FIG. 4, FIG. 7, and FIG. 8).

In FIG. 11, the arrows indicate the direction of travel of the ion beams. Here, the angle formed by the direction of travel of the ion beams relative to the normal L to the surface to be etched 12 Pa will be referred to as an incident angle and represented by the symbol $\alpha$. To etch the surface to be etched 12 Pa by ion beam etching, oxygen ion beams may be used at an incident angle $\alpha$ of 45° or greater. This allows alumina, which is used as the material to form such layers as the insulating layer 13 and the protective layer 17, to be etched at an etching rate similar to that of the metal material used to form such components as the magnetic pole 43 and the plasmon generator 40.

If the metal material that forms the protruding member 39 satisfies the first condition mentioned previously, performing ion beam etching using oxygen ion beams at an incident angle $\alpha$ of 45° or greater makes it possible to bring the first end face 39a of the protruding member 39 into a protruded state toward the magnetic disk 201, i.e., leftward in FIG. 11, relative to the end face 431 of the magnetic pole 43 and the near-field light generating part 412g when the protruding member 39 is not heated and expanded.

The effects of the thermally-assisted magnetic recording head 1 according to the embodiment will now be described. In the embodiment, as described previously, the protruding member 39 has the second feature that when the protruding member 39 is not heated and expanded, the first end face 39a of the protruding member 39 is in a protruded state toward the magnetic disk 201 relative to the end face 431 of the magnetic pole 43 and the near-field light generating part 412g. Furthermore, it is the first feature of the protruding member 39 that the protruding member 39 is heated and expanded by the laser light received at the second end face 39b, so that the first end face 39a gets protruded toward the magnetic disk 201. According to the embodiment, the first and second features of the protruding member 39 allow the main portion of the write head section 16 to be protected even when part of the medium facing surface 12a corresponding to the main portion of the write head section 16 gets protruded. This will be described in detail below.

In the embodiment, the plasmon generator 40 includes the first portion 41 and the second portion 42. The first portion 41 includes the plasmon exciting part 411 and the front end face 412. The front end face 412 has the near-field light generating part 412g. In the first portion 41, surface plasmons are excited on the plasmon exciting part 411 through coupling with the evanescent light generated from the evanescent light generating surface 37c of the core 37. The surface plasmons propagate along the plasmon exciting part 411 to the near-field light generating part 412g. Then, near-field light is generated from the near-field light generating part 412g based on the surface plasmons.

The energy of the laser light propagating through the core 37 is not entirely transformed into near-field light, but is partially transformed into heat in the first portion 41. Accordingly, during the write operation of the thermally-assisted magnetic recording head 1, the first portion 41 and its vicinity increase in temperature. The temperature increase causes the first portion 41 and its vicinity to expand, thereby causing part of the medium facing surface 12a corresponding to the main portion of the write head section 16 to get protruded toward the magnetic disk 201. FIG. 2 shows the state where part of the medium facing surface 12a corresponding to the first portion 41 and the magnetic pole 43 protrudes toward the magnetic disk 201, i.e., leftward in FIG. 2.

In the embodiment, the medium facing surface 12a is covered with and protected by the protective film 80. In the thermally-assisted magnetic recording head 1, as mentioned above, the first portion 41 and its vicinity increase in temperature during write operation, and this causes part of the protective film 80, particularly near the first portion 41, to increase in temperature and become liable to be damaged. The part of the protective film 80 also protrudes toward the magnetic disk 201. The part of the protective film 80 is therefore susceptible to serious damage when brought into contact with the surface of the magnetic disk 201 or a dust particle. A serious damage to the part of the protective film 80 would possibly cause the main portion of the write head section 16 (the plasmon generator 40 and the magnetic pole 43) to be exposed. The main portion of the write head section 16 thus exposed may be damaged. More specifically, the main portion of the write head section 16 may be mechanically damaged when brought into contact with the surface of the magnetic disk 201 or a dust particle, or corroded when exposed to a high-temperature moist atmosphere.

In the embodiment, as described above, the first feature of the protruding member 39 causes the first end face 39a of the protruding member 39 to get protruded toward the magnetic disk 201 during write operation. Here, neither the first portion 41 of the plasmon generator 40 nor the magnetic pole 43 is directly irradiated with the laser light that has propagated through the core 37, whereas the protruding member 39 is directly irradiated with the laser light that has propagated through the core 37 and passed through the front end face 37b. Consequently, as compared with the first portion 41 of the plasmon generator 40 and the magnetic pole 43, the protruding member 39 is capable of producing a greater amount of thermal energy by transforming part of the laser light having propagated through the core 37.

The rear end face of the second portion 42 of the plasmon generator 40 is opposed to a portion of the front end face 37b of the core 37, the portion having an area smaller than 50% of the entire area of the front end face 37b. In contrast to this, the second end face 39b of the protruding member 39 is opposed to at least a portion of the front end face 37b of the core 37 that has an area greater than 50% of the entire area of the front end face 37b. Accordingly, as compared with the second portion 42 of the plasmon generator 40, the protruding member 39 is capable of producing a greater amount of thermal energy by transforming part of the laser light having propagated through the core 37.

Consequently, the embodiment allows the first end face 39a of the protruding member 39 to get protruded more than the plasmon generator 40 and the magnetic pole 43 during write operation. According to the embodiment, it is therefore possible that when the protective film 80 comes into contact with the surface of the magnetic disk 201 or a dust particle during write operation, a portion of the protective film 80 in the vicinity of the main portion of the write head section 16 will not contact the surface of the magnetic disk 201 or the dust particle but a portion of the protective film 80 in the vicinity of the protruding member 39 will contact the surface of the magnetic disk 201 or the dust particle. This makes it possible to prevent the portion of the protective film 80 in the vicinity of the main portion of the write head section 16 from being damaged by contact with the surface of the magnetic disk 201 or a dust particle, and thereby allows the main portion of the write head section 16 to be prevented from being exposed.

As can be seen from the foregoing, according to the embodiment, it is possible to protect the main portion of the write head section 16 even when part of the medium facing surface 12a corresponding to the main portion of the write head section 16 gets protruded.

In the embodiment, when the protruding member 39 is not heated and expanded, the first end face 39a of the protruding member 39 is in a protruded state toward the magnetic disk 201 relative to the end face 431 of the magnetic pole 43 and the near-field light generating part 412g. According to the embodiment, this second feature of the protruding member 39 makes it possible to protect the main portion of the write head section 16 during write operation with higher reliability, and also allows the main portion of the write head section 16 to be protected other than during write operation.

Note that in the present invention, the first feature of the protruding member 39 is an absolute requirement, but the second feature of the protruding member 39 is not an absolute requirement. More specifically, even when the protruding member 39 does not have the second feature, the main portion of the write head section 16 can be protected during write operation if the first end face 39a of the protruding member 39 protrudes more than the plasmon generator 40 and the magnetic pole 43 during write operation.

According to the embodiment, where the metal that forms the protruding member 39 satisfies the second condition mentioned previously, it is possible to prevent the protruding member 39 from being scratched upon contact with the surface of the magnetic disk 201 or a dust particle when the first end face 39a is not covered with and protected by the protective film 80.

According to the embodiment, where the metal that forms the protruding member 39 satisfies the third condition mentioned previously, it is possible to prevent the protruding member 39 from melting due to frictional heat upon contact with the surface of the magnetic disk 201 or a dust particle when the first end face 39a is not covered with and protected by the protective film 80.

In the embodiment, as shown in FIG. 3, the protruding member 39 is greater than the magnetic pole 43 and the plasmon generator 40 (the first and second portions 41 and 42) in width in the track width direction TW (the Y direction). Thus, the protruding member 39 is present in any cross section that passes through at least one of the magnetic pole 43 and the plasmon generator 40 and that is perpendicular to the track width direction TW. As such, according to the embodiment, in any one of the cross sections described above, the first end face 39a of the protruding member 39 is allowed to protrude toward the magnetic disk 201 to thereby protect the main portion of the write head section 16.

The present invention is not limited to the foregoing embodiment, and various modifications may be made thereto. For example, as far as the requirements of the appended claims are met, the shapes and the arrangement of the core 37, the protruding member 39, the plasmon generator 40, and the magnetic pole 43 may be arbitrarily chosen without being limited to the example illustrated in the foregoing embodiment.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A thermally-assisted magnetic recording head comprising:
    a medium facing surface that faces a magnetic recording medium;
    a magnetic pole that has an end face located in the medium facing surface and produces a write magnetic field for writing data on the magnetic recording medium;
    a waveguide including a core and a cladding, the core having a front end face that faces toward the medium facing surface and allowing light to propagate through;
    a plasmon generator having a near-field light generating part located in the medium facing surface, the plasmon generator being configured so that a surface plasmon is excited on the plasmon generator based on the light propagating through the core and the near-field light generating part generates near-field light based on the surface plasmon; and
    a protruding member disposed between the front end face of the core and the medium facing surface, wherein:
    the protruding member has a first end face located in the medium facing surface, and a second end face facing toward the front end face of the core and receiving light that has propagated through the core and passed through the front end face, the protruding member being formed of a metal that is different from both a material that forms the magnetic pole and a material that forms the plasmon generator;
    the second end face of the protruding member is opposed to at least part of the front end face of the core, the at least part having an area greater than 50% of an entire area of the front end face; and
    the protruding member is configured so that the light received at the second end face causes the protruding member to be heated and expanded to cause the first end face to get protruded toward the magnetic recording medium.

2. The thermally-assisted magnetic recording head according to claim 1, wherein:
    the core has an evanescent light generating surface that generates evanescent light based on the light propagating through the core;
    the plasmon generator has a plasmon exciting part that faces the evanescent light generating surface with a predetermined spacing therebetween; and
    the plasmon generator is configured so that the surface plasmon is excited on the plasmon exciting part through coupling with the evanescent light generated from the evanescent light generating surface, the surface plasmon propagates to the near-field light generating part, and the near-field light generating part generates the near-field light based on the surface plasmon.

3. The thermally-assisted magnetic recording head according to claim 1, wherein, when the protruding member is not heated and expanded, the first end face of the protruding member is in a protruded state toward the magnetic recording medium relative to the end face of the magnetic pole and the near-field light generating part.

4. The thermally-assisted magnetic recording head according to claim 1, wherein, in the medium facing surface, the protruding member is greater than the magnetic pole and the plasmon generator in width in a track width direction.

5. The thermally-assisted magnetic recording head according to claim 1, wherein:
    the material that forms the magnetic pole contains one of Ni, Fe, and Co;
    the material that forms the plasmon generator contains one of Au, Ag, Al, and Cu; and
    the metal that forms the protruding member is lower in etching rate than Au, Ag, Al, Cu, Ni, Fe, and Co when etched by ion beam etching using oxygen ion beams at an incident angle of 45° or greater.

6. The thermally-assisted magnetic recording head according to claim 1, wherein the metal that forms the protruding member has a Mohs' hardness of 6 or more.

7. The thermally-assisted magnetic recording head according to claim 1, wherein the metal that forms the protruding member has a melting point of 1100° C. or higher.

8. The thermally-assisted magnetic recording head according to claim 1, wherein the metal that forms the protruding member is one of Cr, Ti, Ta, V, and Nb.

9. The thermally-assisted magnetic recording head according to claim 8, wherein:
    the material that forms the magnetic pole contains one of Ni, Fe, and Co; and
    the material that forms the plasmon generator contains one of Au, Ag, Al, and Cu.

10. The thermally-assisted magnetic recording head according to claim 1, further comprising a pair of leads for supplying a current to the protruding member.

11. A head gimbal assembly comprising the thermally-assisted magnetic recording head according to claim 1, and a suspension that supports the thermally-assisted magnetic recording head.

12. A magnetic recording device comprising: a magnetic recording medium; the thermally-assisted magnetic recording head according to claim 1; and a positioning device that supports the thermally-assisted magnetic recording head and positions the thermally-assisted magnetic recording head with respect to the magnetic recording medium.

* * * * *